US011327379B2

(12) United States Patent
Shan

(10) Patent No.: US 11,327,379 B2
(45) Date of Patent: May 10, 2022

(54) DISPLAY DEVICE AND DISPLAY PANEL THEREOF, AND MANUFACTURING METHOD FOR DISPLAY DEVICE

(71) Applicant: HKC Corporation Limited, Shenzhen (CN)

(72) Inventor: Jianfeng Shan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/954,072

(22) PCT Filed: Sep. 11, 2018

(86) PCT No.: PCT/CN2018/105085
§ 371 (c)(1),
(2) Date: Jun. 15, 2020

(87) PCT Pub. No.: WO2019/119894
PCT Pub. Date: Jun. 27, 2019

(65) Prior Publication Data
US 2021/0165295 A1    Jun. 3, 2021

(30) Foreign Application Priority Data
Dec. 21, 2017 (CN) .......................... 201711393080.1

(51) Int. Cl.
*G02F 1/1362* (2006.01)
*G02F 1/1339* (2006.01)

(52) U.S. Cl.
CPC .. *G02F 1/136295* (2021.01); *G02F 1/136222* (2021.01); *G02F 1/13394* (2013.01); *G02F 1/13398* (2021.01); *G02F 1/136213* (2013.01)

(58) Field of Classification Search
CPC ................................................. G02F 1/136213
See application file for complete search history.

(56) References Cited

U.S. PATENT DOCUMENTS

| 2004/0007705 | A1* | 1/2004 | Song | G02F 1/13458 257/72 |
| 2007/0159588 | A1* | 7/2007 | Yoon | G02F 1/13394 349/156 |
| 2017/0235178 | A1* | 8/2017 | Liu | G02F 1/1368 349/42 |
| 2021/0080791 | A1* | 3/2021 | Shan | G02F 1/13394 |

FOREIGN PATENT DOCUMENTS

| CN | 101995714 A | 3/2011 |
| CN | 104062816 A | 9/2014 |

* cited by examiner

*Primary Examiner* — Alexander P Gross
(74) *Attorney, Agent, or Firm* — WPAT, PC

(57) ABSTRACT

The present application provides a display panel and a manufacturing method thereof. The display panel includes a base substrate; scanning lines, formed on the base substrate; data lines, formed on the base substrate and intersecting with the scanning lines; and a plurality of pixel units, defined by intersection of the scanning lines and the data lines. The display panel further includes a common electrode wire, insulated from the data lines and the scanning lines, wherein the common electrode wire includes a plurality of connecting leads and spanning structures, and the plurality of connecting leads located in the same column are electrically connected by the spanning structures; and a plurality of conductive support columns, electrically connected to the common electrode wire by the spanning structures.

3 Claims, 12 Drawing Sheets

DISPLAY DEVICE AND DISPLAY PANEL THEREOF, AND MANUFACTURING METHOD FOR DISPLAY DEVICE

FIELD OF THE DISCLOSURE

The present application relates to display technologies, in particular to a display device and a manufacturing method for a display device.

BACKGROUND

With the development of display technologies, the display effect of display panels is continuously improved, such that the display panels are widely applied to various display products such as mobile phones, tablet computers, the information inquiry machines in lobbies of public occasions and the like, to meet different needs of users.

However, when the existing display panels display images, coupling phenomenon exists between a common electrode and data lines, as a result, the display panels have defects of signal crosstalk and uneven display. Besides, voltages on the common electrode and a common electrode wire of the display panels are instable, and cannot be quickly recovered after coupling, thereby affecting a display quality of the display.

SUMMARY

The present application provides a display device, a display panel thereof and a manufacturing method for a display device, so as to achieve the purpose of improving a display effect of the display device.

The present application provides a display panel, including a base substrate; scanning lines, formed on the base substrate; data lines, formed on the base substrate and intersecting with the scanning lines; and at least one pixel unit, defined by intersection of the scanning lines and the data lines; wherein the display panel further includes a common electrode wire, insulated from the data lines and the scanning lines; wherein the common electrode wire includes a plurality of connecting leads and spanning structures, and the plurality of connecting leads located in the same column are electrically connected by the spanning structures; and at least one conductive support column, electrically connected to the common electrode wire by the spanning structures.

The present application also provides a display device, including a color filter substrate, including a common electrode layer; and a display panel, facing the common electrode layer, and disposed opposite to the color filter substrate. The display panel further includes a base substrate; scanning lines, formed on the base substrate; data lines, formed on the base substrate and intersecting with the scanning lines; a plurality of pixel units, defined by intersection of the scanning lines and the data lines; and a common electrode wire, insulated from the data lines and the scanning lines, wherein the common electrode wire includes a plurality of connecting leads and spanning structures, and the plurality of connecting leads located in the same column are electrically connected by the spanning structures; and a plurality of conductive support columns, wherein each conductive support column includes a first end and a second end disposed opposite to the first end; the first ends are electrically connected to the common electrode wire by the spanning structures; and the second ends are electrically connected to the common electrode layer.

The present application also provides a manufacturing method for the above display device, including the following steps: providing a color filter substrate provided with a common electrode layer; and obtaining a display panel: providing a base substrate, and manufacturing scanning lines, data lines and a plurality of pixel units defined by intersection of the scanning lines and the data lines on the base substrate; manufacturing a plurality of connecting leads and spanning structures enabling the plurality of connecting leads to be electrically connected on the base substrate, to obtain a common electrode wire insulated from the data lines and scanning lines, the connecting leads and the scanning lines being same in material and located in the same film layer; forming conductive support columns on one side of the display panel provided with the pixel units or one side of the color filter substrate provided with the common electrode layer; and aligning and laminating the display panel with the color filter substrate, such that first ends of the conductive support columns are electrically connected to the common electrode layer, and the second ends of the conductive support columns opposite to the first ends are electrically connected to the common electrode wire.

According to the embodiments of the present application, by disposing the conductive support columns between the display panel and the color filter substrate, the first ends of the conductive support columns are electrically connected to the common electrode layer on the color filter substrate, and the second ends of the conductive support columns opposite to the first ends are electrically connected to the common electrode wire. The problem of signal crosstalk and uneven display of the display devices caused by a coupling phenomenon between a common electrode and the data lines of the existing display devices and the problem that the voltages on the common electrode and the common electrode wire of the display devices are instable and cannot be quickly recovered after coupling are solved. The effects of inhibiting the coupling phenomenon between the common electrode and the data lines, improving the stability of the voltages on the common electrode and the common electrode wire and quickly recovering the voltages after coupling are achieved.

In addition, the embodiments of the present application further optimize the structure of the common electrode wire, by designing the common electrode wire to consist of the plurality of connecting leads and the plurality of spanning structures, electric insulation between the common electrode wire and the scanning lines is ensured. In a manufacturing process, the connecting leads and the scanning lines are same in material and are located in the same film layer. Therefore, the common electrode wire and the scanning lines can be manufactured in the same manufacturing process by adopting the same metal mask, and process and cost are saved.

BRIEF DESCRIPTION OF THE DRAWINGS

FIG. 4b is a sectional structural view along B1-B2 in FIG. 4a.

FIG. 5b is a sectional structural view along A1-A2 in FIG. 5a.

DETAILED DESCRIPTION OF PREFERRED EMBODIMENTS

The present application is further explained in detail in combination with accompanying drawings and embodiments. It is understandable that the specific embodiments described herein are merely intended for explaining rather than limiting the present application. In addition, it also should be noted that in order for convenience for description, the accompanying drawings only show related part of instead of all structures of the present application.

The display devices involved in the present application may be divided into TN, OCB, VA type and curve surface liquid crystal display devices, but not limited thereto. The liquid crystal display devices may apply straight down backlight, and backlight sources may be white light, RGB three-color light sources, RGBW four-color light sources or RGBY four-color light sources, but not limited thereto.

Figure 1:
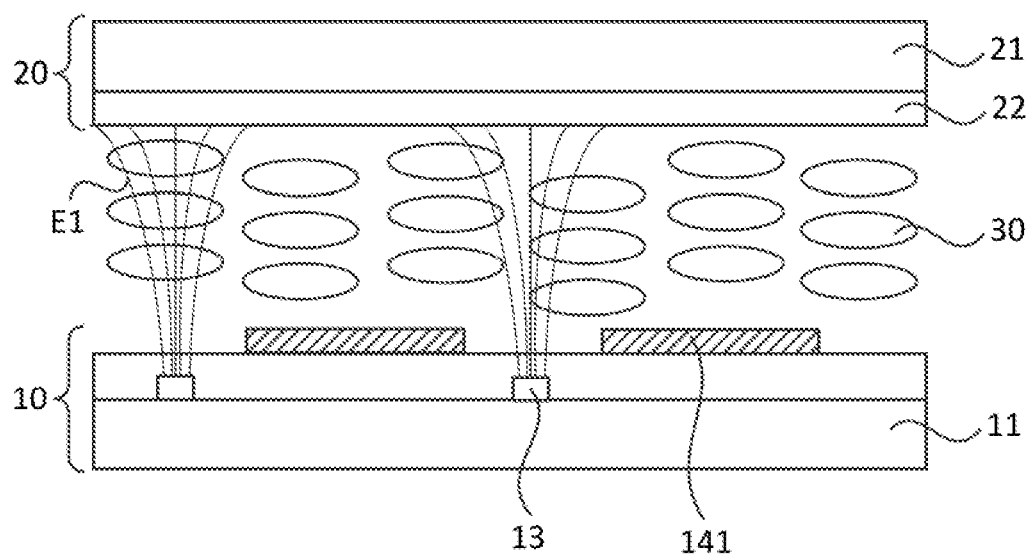
FIG. 1 is a structural schematic view of a display device of related arts.

FIG. 1 is a structural schematic view of a display device of related arts. Referring to FIG. 1, the display device includes a first substrate 10, a second substrate 20 opposite to the first substrate 10 and a liquid crystal layer 30 located between the first substrate 10 and the second substrate 20. The first substrate 10 includes a first base substrate 11, scanning lines (not shown in FIG. 1) and data lines 13 formed on the first base substrate 11, and a plurality of pixel (not shown in FIG. 1) units defined by intersection of the scanning lines and the data lines 13. The plurality of pixel units are in an array structure. The pixel units include pixel electrodes 141. The second substrate 20 includes a second base substrate 21 and a common electrode layer 22 formed on one side of the second base substrate 21 close to the first substrate 10, and the common electrode layer 22 is provided with at least one common electrode (not shown in FIG. 1).

When in image display, a scan signal is sent to each scanning line in sequence, such that a data signal can be transmitted to the pixel electrodes 141 in the pixel units in the first substrate 10 by the data lines 13. Meanwhile, a common voltage signal is provided for the common electrode, such that an electric field for controlling deflection of liquid crystal molecules is formed between the pixel electrodes 141 and the common electrode. Under the action of such electric field, the liquid crystal molecules are deflected, and further a display picture is generated.

Continuing to refer to FIG. 1, in an actual working process of the display device, coupling and crosstalk phenomena will occur between the data lines 13 and the common electrode layer 22. For example, an electric field E1 is formed between the data lines 13 and the common electrode layer 22, and due to the existence of the electric field E1, deflection angles of the liquid crystal molecules nearby the data lines 13 will be effected, as a result, the display device has the phenomena of signal crosstalk and uneven display, and a display quality of the display device is affected.

Figure 2:
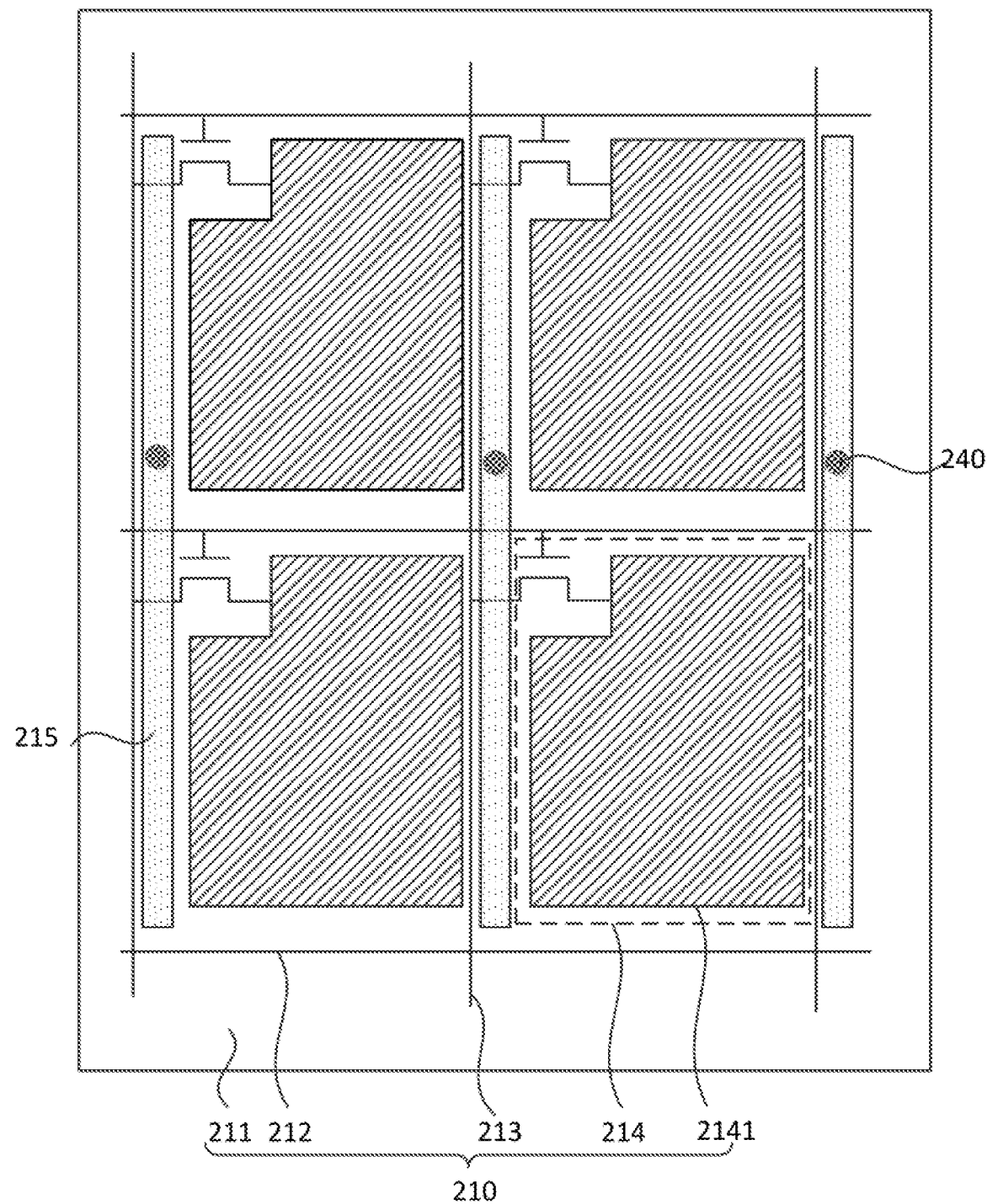
FIG. 2 is a structural schematic view of a display panel provided by an embodiment of the present application.

In view of this, the embodiment of the present application provides a display panel, to improve a display effect of the display device. FIG. 2 is a structural schematic view of the display panel in one embodiment of the present application. Referring to FIG. 2, the display panel 210 includes a first base substrate 211, scanning lines 212 and data lines 213 formed on the first base substrate 211, and a plurality of pixel units 214 defined by intersection of the scanning lines 212 and the data lines 213. The display panel 210 further includes a common electrode wire 215, and the common electrode wire 215 is disposed between every two adjacent pixel units 214 and is insulated from the data lines 213 and the scanning lines 214. Optionally, the common electrode wire 215 may for example avoid the data lines 213 and be disposed on one side of the data lines 213.

By disposing the common electrode wire 215 between every two adjacent pixel units 214, the common electrode wire 215 may be used to play a role of shielding, and further the electric field E1 formed between a common electrode and the data lines 213 is weakened or eliminated. The display panel 210 further includes conductive support columns 240 disposed on the common electrode wire 215, and the conductive support columns 240 are electrically connected to the common electrode wire 215. Wherein, the conductive support columns 240 include first ends and second ends disposed opposite to the first ends. The second ends of the conductive support columns 240 are electrically connected to the common electrode wire 215, and the first ends of the conductive support columns 240 are electrically connected to a common electrode layer (generally disposed on another opposite substrate and not shown in FIG. 2). In this way, the stability of voltages on the common electrode and the common electrode wire 215 can be improved, such that the voltages can be quickly recovered after coupling. The problem of signal crosstalk and uneven display of the display device caused by a coupling phenomenon between the common electrode and the data lines 213 of the existing display device and the problem that the voltages on the common electrode and the common electrode wire 215 of the display device are instable and cannot be quickly recovered after coupling are solved. The effects of inhibiting the coupling phenomenon between the common electrode and the data lines 213, improving the stability of the voltages on the common electrode and the common electrode wire 215 and quickly recovering the voltages after coupling are achieved. Further, the display effect of the display device is improved.

Figure 3:
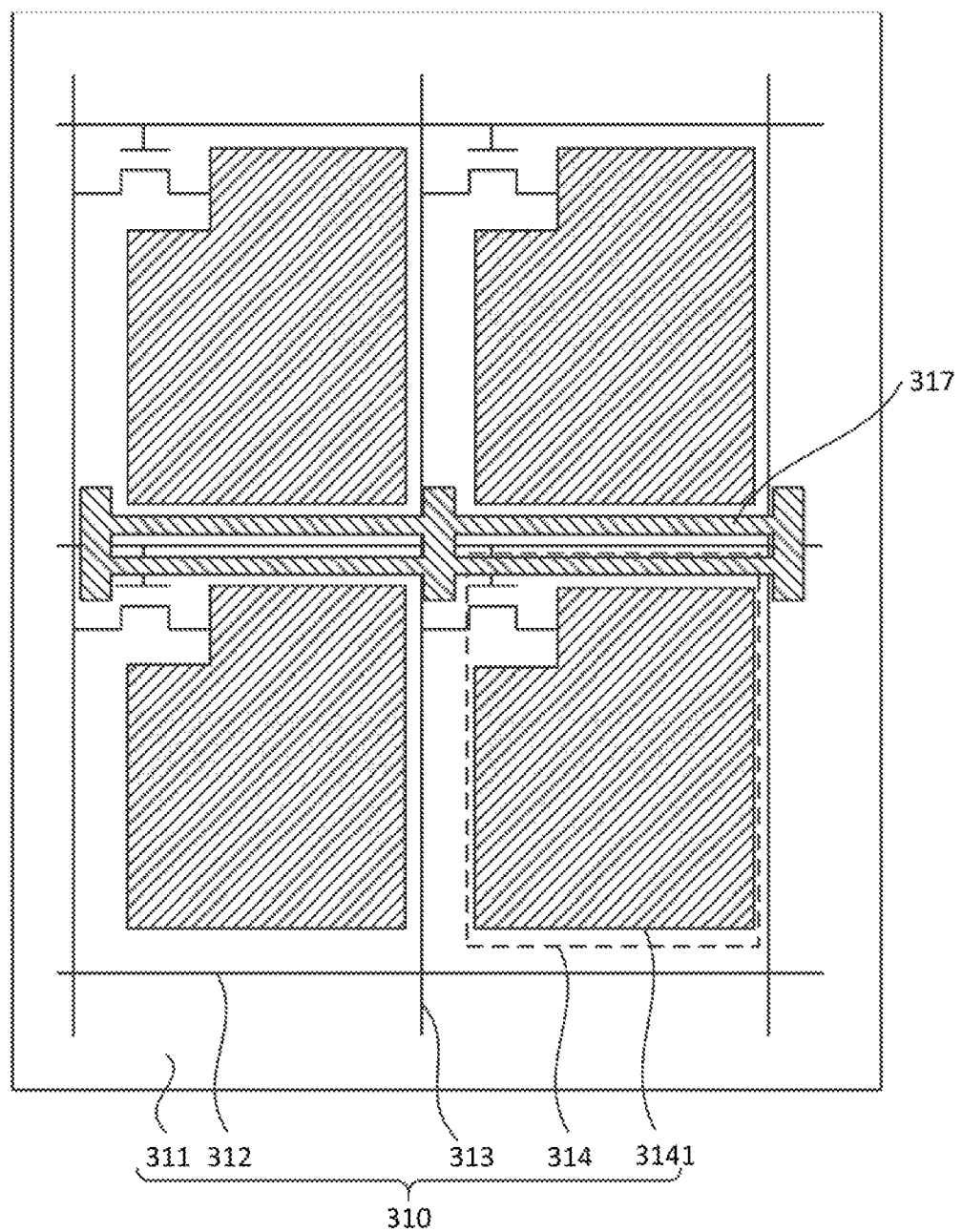
FIG. 3 is a structural schematic view of a display panel provided by another embodiment of the present application.

In another embodiment of the present application, as shown in FIG. 3, there is provided a display panel 310, including a first base substrate 311, scanning lines 312 and data lines 313 formed on the first base substrate 311, and a plurality of pixel units 314 defined by intersection of the scanning lines 312 and the data lines 313. Each pixel unit 314 includes a pixel electrode 3141. The display panel 310 further includes shield electrodes 317, and the shield electrodes 317 are located between the scanning lines 312 and the pixel electrodes 3141 adjacent to the scanning lines 312, and are insulated from the scanning lines 312.

Considering that in the existing display devices, a scan voltage transmitted on the scanning lines 312 is relatively high, and a very strong electric field will be formed between the scanning lines and the common electrode layer (located on another opposite substrate and not shown in FIG. 3), and such electric field will effect a deflection angle of liquid crystal. Particularly, under the condition of relative shift of the two substrates, the display device will have a phenomenon of uneven display, and a display quality of the display device is affected. Specifically, the scanning lines 312 are disposed between the pixel units 314 of two adjacent rows and the shield electrodes 317 are disposed between the scanning lines 312 and the pixel electrodes 3141 adjacent thereto. In this way, by using a shielding action of the shield electrodes 317, the electric field formed between the common electrode and the scanning lines 312 is weakened or eliminated, and further the display effect of the display device is improved.

In yet another embodiment of the present application, there is provided a display panel optimizing a structure of the common electrode wire.

Figure 4A:
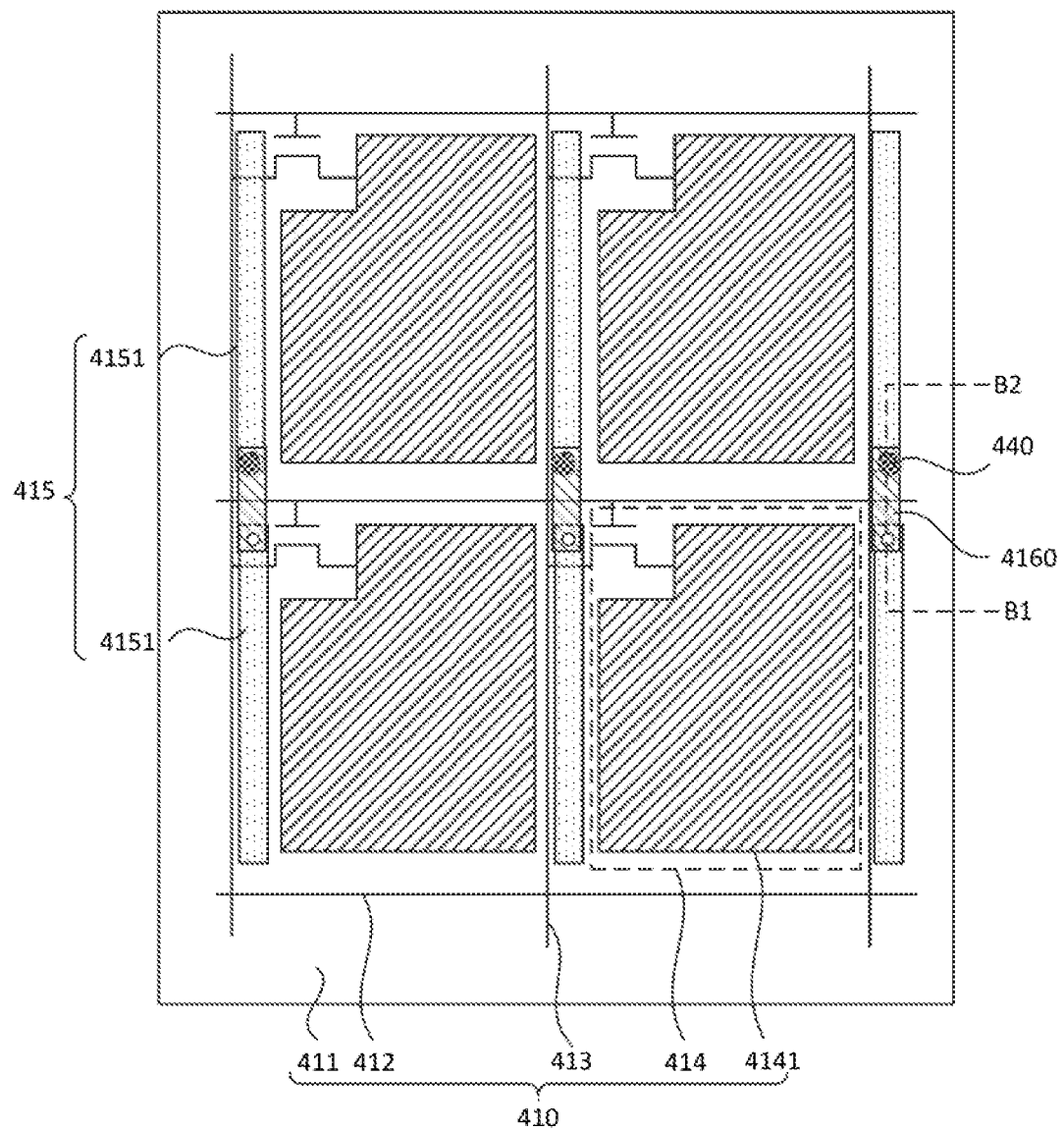
FIG. 4a is a structural schematic view of a display panel provided by yet another embodiment of the present application.

As shown in FIG. 4a, the display panel 410 of the present embodiment includes a first base substrate 411, scanning lines 412 and data lines 413 formed on the first base substrate 411, and a plurality of pixel units 414 defined by intersection of the scanning lines 412 and the data lines 413. The display panel 410 further includes a common electrode wire 415, and the common electrode wire 415 is disposed between every two adjacent pixel units 414 and is insulated from the data lines 413 and the scanning lines 414. A plurality of conductive support columns 440 are dispersedly disposed on the common electrode wire 415 and are electrically connected to the common electrode wire 415. Optionally, the common electrode wire 415 may for example avoid the data lines 413 and be disposed on one side of the data lines 413, such that the conductive support columns 440 can be smoothly electrically connected to the common electrode wire 415.

Similarly, according to the embodiment of the present application, by disposing the common electrode wire 415 between every two adjacent pixel units 414, the common electrode wire 415 may be used to play a role of shielding, and the electric field E1 formed between a common electrode and the data lines 413 is further weakened or eliminated.

Further, the plurality of pixel units 414 are arranged in an array structure, the data lines 413 are located between the pixels units 414 of adjacent columns, and the scanning lines 412 are located between the pixels units 414 of adjacent rows. The common electrode wire 415 includes a plurality of connecting leads 4151, the connecting leads 4151 are located between every two adjacent pixels units 414 of the same row, and an extending direction of the connecting leads 4151 is same as that of the data lines 413. The plurality of connecting leads 4151 located in the same column are electrically connected by spanning structures 4160, to ensure that the common electrode wire 415 is insulated from the scanning lines 412. When in specific arrangement, the connecting leads 4151 and the scanning lines 412 may be disposed to be same in material and located in the same film layer. In this way, in a manufacturing process, there is no need to respectively manufacture a mask for the common electrode wire 415 and the scanning lines 412, and the common electrode wire 415 and the scanning lines 412 can be manufactured in the same manufacturing process. The manufacturing process is simplified, production efficiency of the display device is improved, and a production cost of the display device is reduced.

Figure 4B:
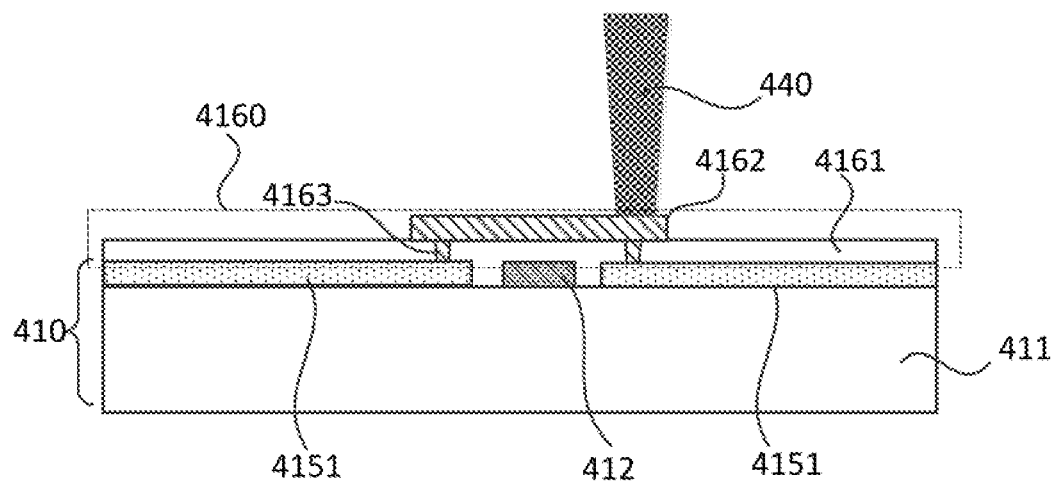

FIG. 4b is a sectional structural view along B1-B2 in FIG. 4a. Referring to FIG. 4b, the spanning structures 4160 further include insulating layers 4161 and connecting blocks 4162. The insulating layers 4161 cover the connecting leads 4151 and the scanning lines 412 between every two adjacent connecting leads 4151. The insulating layers 4161 are provided with via holes 4163, and the via holes 4163 expose part of areas of the connecting leads 4151. The connecting blocks 4162 cover the insulating layers 4161 and fill the via holes 4163, such that the plurality of connecting leads 4151 in the same column are electrically connected. The conductive support columns 440 are located above the via holes 4163 and are electrically connected to the connecting blocks 4162. A material of the connecting blocks 4162 is a conductive material.

Figure 4C:
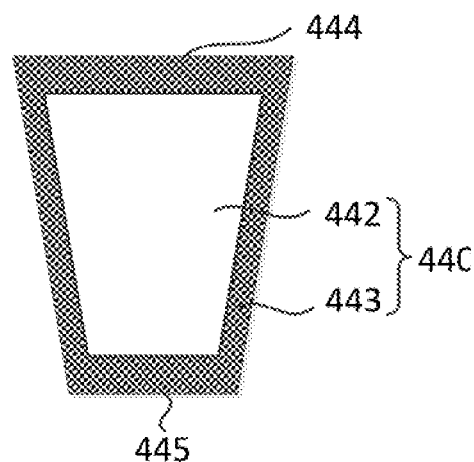
FIG. 4c is a structural schematic view of another conductive support column provided by an embodiment of the present application.

FIG. 4c is a structural schematic view of another conductive support column provided by the embodiment of the present application. Further, in combination with FIG. 4c, the conductive support columns 440 include first ends 444 and second ends 445 opposite to the first ends 444, the first ends 444 are disposed to be electrically connected to a common electrode layer on a color filter substrate 20, and the second ends 445 are electrically connected to the common electrode wire 415.

For example, the conductive support columns 440 may include support column main bodies 442 and coating layers 443 coating the support column main bodies 442, and the coating layers 443 are electrically connected to the common electrode layer 22 on the color filter substrate 20 and the common electrode wire 415 on the display panel.

Figure 4D:
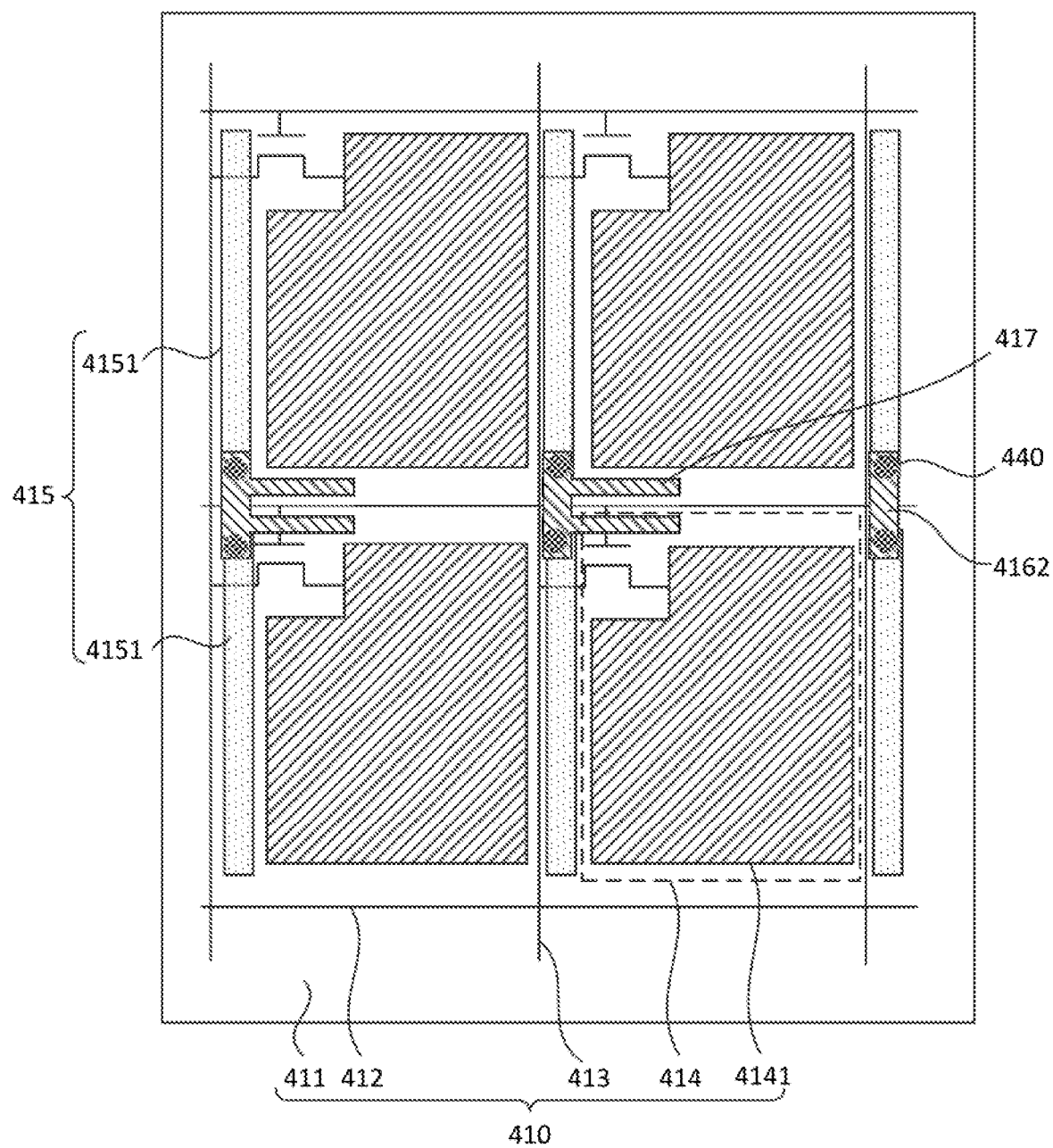
FIG. 4d is a structural schematic view of another display panel provided by an embodiment of the present application.

In yet another embodiment of the present application, considering that in the existing display panel, a scan voltage transmitted on the scanning lines 412 is relatively high, and a very strong electric field will be formed between the scanning lines and a common electrode, and such electric field will effect a deflection angle of liquid crystal. Particularly, under the condition of relative shift of the display panel 410 and the color filter substrate 20, the display device will have a phenomenon of uneven display, and a display quality of the display device is affected. FIG. 4d is a structural schematic view of another display panel provided by the embodiment of the present application. Referring to FIG. 4d, the display panel 410 further includes shield electrodes 417, and the shield electrodes 417 are located between the scanning lines 412 and the pixel electrodes 414 adjacent to the scanning lines 412, and are insulated from the scanning lines 412. In this way, by using a shielding action of the shield electrodes 417, the electric field formed between the common electrode and the scanning lines 412 is weakened or eliminated, and further the display effect of the display device is improved.

Continuing to refer to FIG. 4d, further, the shield electrodes 417 are electrically connected to the connecting blocks 4162. In a manufacturing process, the shield electrodes 417 and the connecting blocks 4162 are same in material and are located in the same film layer. In this way, in a manufacturing process, there is no need to respectively manufacture a mask for the shield electrodes 417 and the connecting blocks 4162, and the shield electrodes 417 and the connecting blocks 4162 can be manufactured in the same manufacturing process. The manufacturing process is simplified, production efficiency of the display device is improved, and a production cost of the display device is reduced.

According to the display panel provided by the embodiment of the present application, by disposing the common electrode wire 415 between every two adjacent pixel units 414, the common electrode wire 415 may be used to play a role of shielding, and further the electric field E1 formed between the common electrode and the data lines 413 is weakened or eliminated. In yet another embodiment, by disposing the conductive support columns 440 between the two substrates, the conductive support columns 440 are electrically connected to the common electrode wire 415. The stability of voltages on the common electrode and the common electrode wire 415 can be improved, such that the voltages can be quickly recovered after coupling. The problem of signal crosstalk and uneven display of the display device caused by a coupling phenomenon between the common electrode and the data lines 413 of the existing display device and the problem that the voltages on the common electrode and the common electrode wire 415 of the display device are instable and cannot be quickly recovered after coupling are solved. The effects of inhibiting the coupling phenomenon between the common electrode and the data lines 413, improving the stability of the voltages on the common electrode and the common electrode wire 415 and quickly recovering the voltages after coupling are achieved. Further, the display effect of the display device is improved.

Figure 5A:
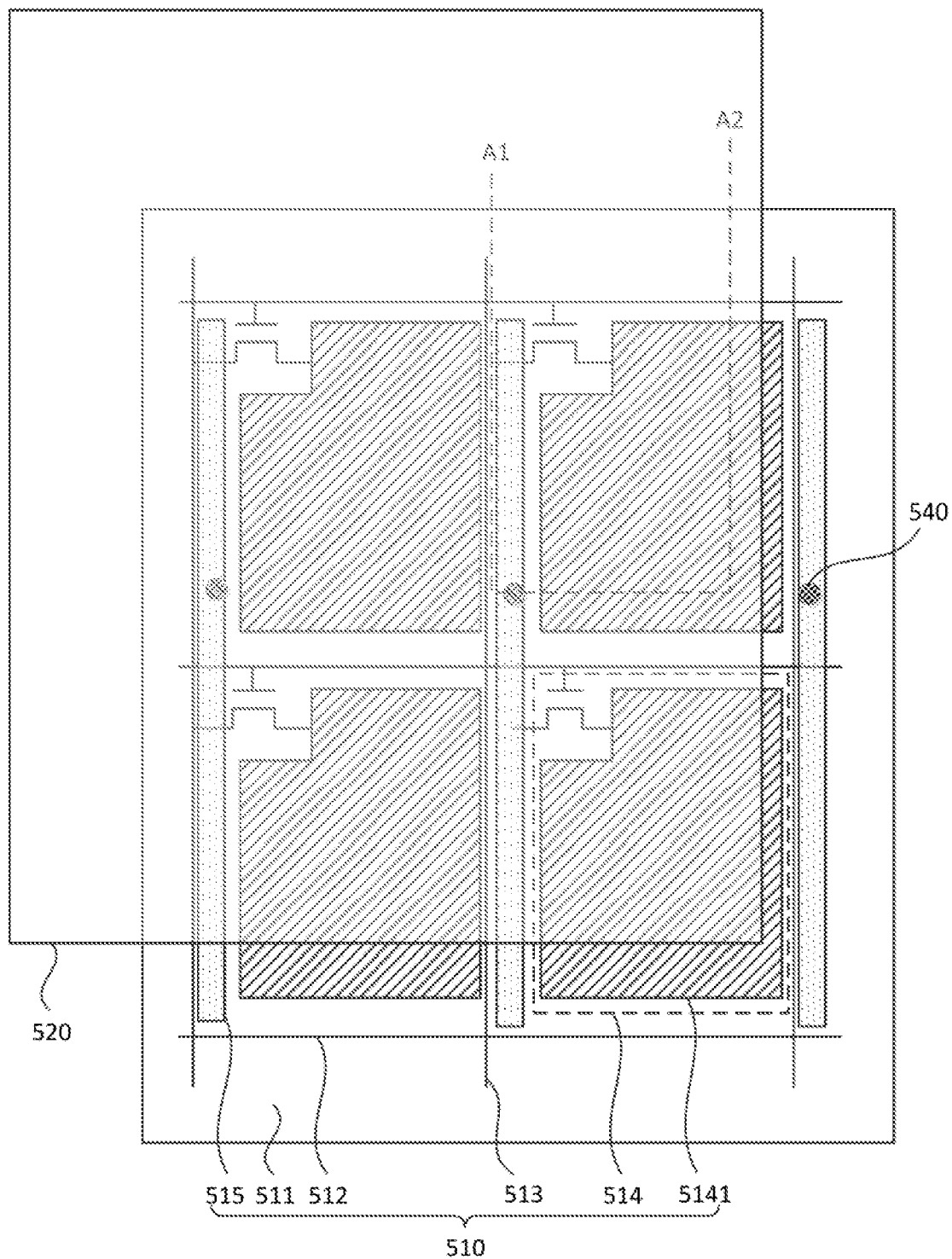
FIG. 5a is a structural schematic view of a display device provided by still a further embodiment of the present application.
Figure 5B:
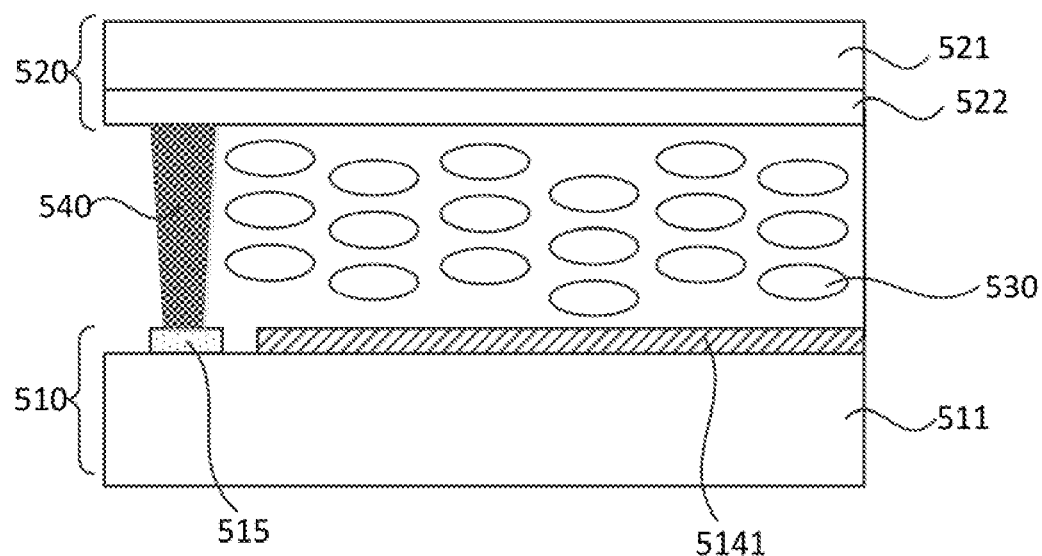

Based on the same inventive concept, the present application further provides a display device 500, as shown in FIGS. 5a and 5b, the display device 500 includes a color filter substrate 520 and a display panel 510 (it can also be referred to as an array substrate) disposed oppositely, and a liquid crystal layer 530 sandwiched between the color filter substrate 520 and the display panel 510. Wherein, one side of the color filter substrate 520 facing the display panel 510 is provided with a common electrode layer 522.

The display panel 510 includes a first base substrate 511, scanning lines 512 and data lines 513 formed on the first base substrate 511, and a plurality of pixel units 514 defined by intersection of the scanning lines 512 and the data lines 513.

The display panel 510 further includes a common electrode wire 515, and the common electrode wire 515 is disposed between every two adjacent pixel units 514 and is insulated from the data lines 513 and the scanning lines 514. A plurality of conductive support columns 540 are dispersedly disposed on the common electrode wire 515 and are electrically connected to the common electrode wire 515. Optionally, the common electrode wire 515 may for example avoid the data lines 513 and be disposed on one side of the data lines 513.

Similarly, according to the embodiment of the present application, by disposing the common electrode wire 515 between every two adjacent pixel units 514, the common electrode wire 515 may be used to play a role of shielding, and the electric field E1 formed between a common electrode and the data lines 513 is further weakened or eliminated.

Figure 5C:
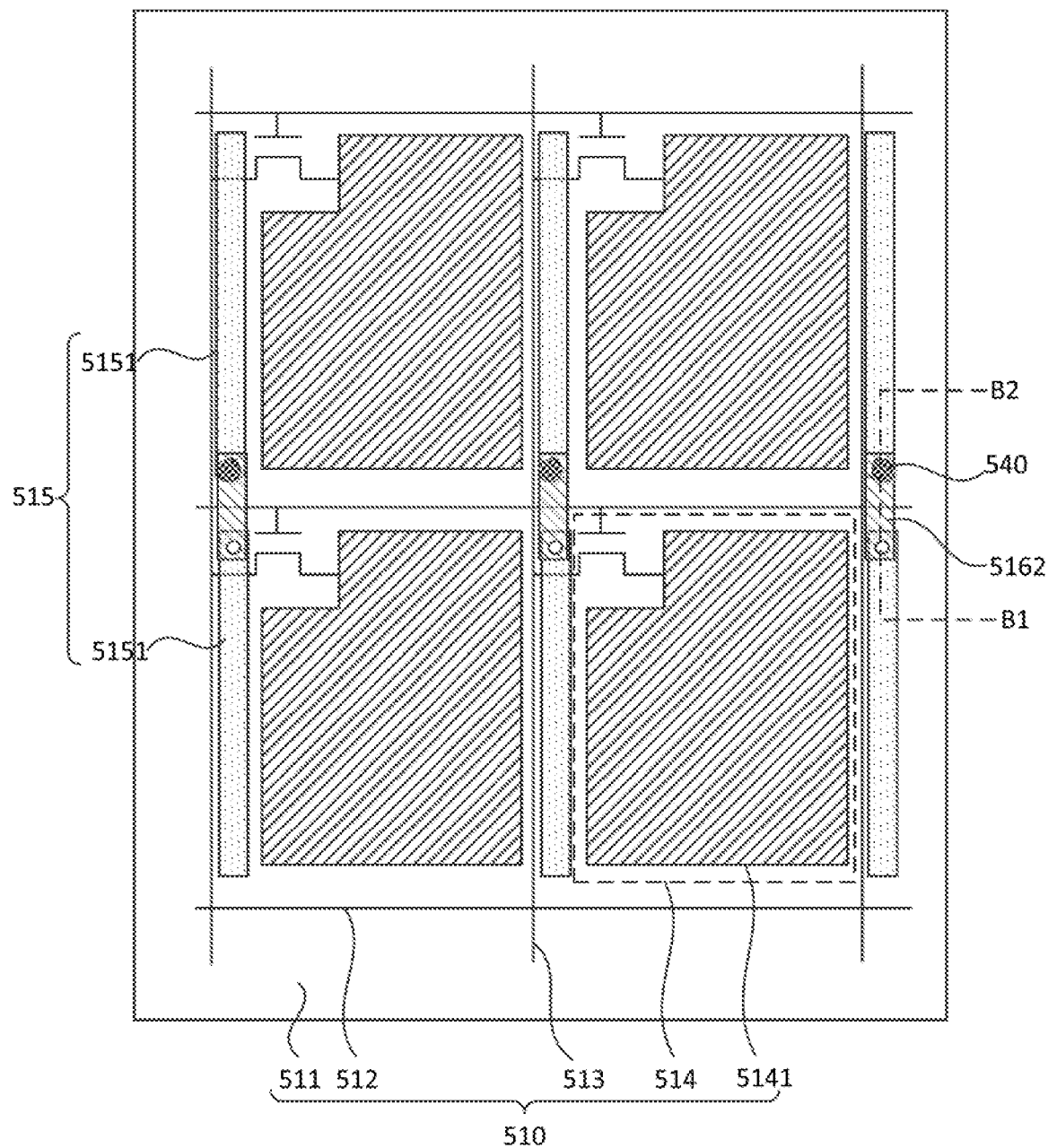
FIG. 5c is a structural schematic view of a display panel provided by still a further embodiment of the present application.

Further, in combination with FIG. 5c, the plurality of pixel units 514 are arranged in an array structure, the data lines 513 are located between the pixels units 514 of adjacent columns, and the scanning lines 512 are located between the pixels units 514 of adjacent rows. The common electrode wire 515 includes a plurality of connecting leads 5151, the connecting leads 5151 are located between every two adjacent pixels units 514 of the same row, and an extending direction of the connecting leads 5151 is same as that of the data lines 513. The plurality of connecting leads 5151 located in the same column are electrically connected by spanning structures 5160, to ensure that the common electrode wire 515 is insulated from the scanning lines 512. When in specific arrangement, the connecting leads 5151 and the scanning lines 512 may be disposed to be same in material and located in the same film layer. In this way, in a manufacturing process, there is no need to respectively manufacture a mask for the common electrode wire 515 and the scanning lines 512, and the common electrode wire 515 and the scanning lines 512 can be manufactured in the same manufacturing process. The manufacturing process is simplified, production efficiency of the display device is improved, and a production cost of the display device is reduced.

Figure 5D:
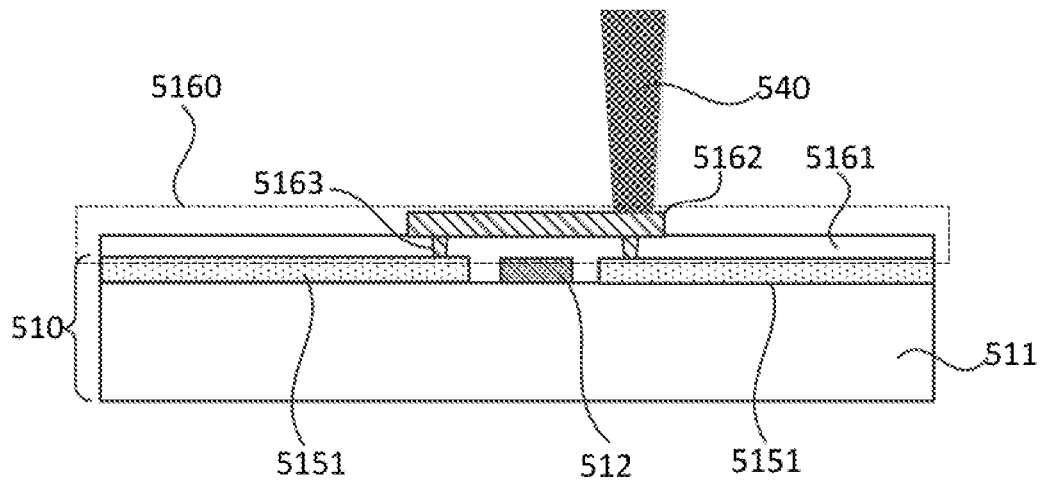
FIG. 5d is a sectional structural view along B1-B2 in FIG. 5c.

In combination with FIG. 5d, the spanning structures 5160 further include insulating layers 5161 and connecting blocks 5162. The insulating layers 5161 cover the connecting leads 5151 and the scanning lines 512 between every two adjacent connecting leads 5151. The insulating layers 5161 are provided with via holes 5163, and the via holes 5163 expose part of areas of the connecting leads 5151. The connecting blocks 5162 cover the insulating layers 5161 and fill the via holes 5163, such that the plurality of connecting leads 5151 in the same column are electrically connected. The conductive support columns 540 are located above the via holes 5163 and are electrically connected to the connecting blocks 5162. A material of the connecting blocks 5162 is a metal conductive material.

Figure 5E:
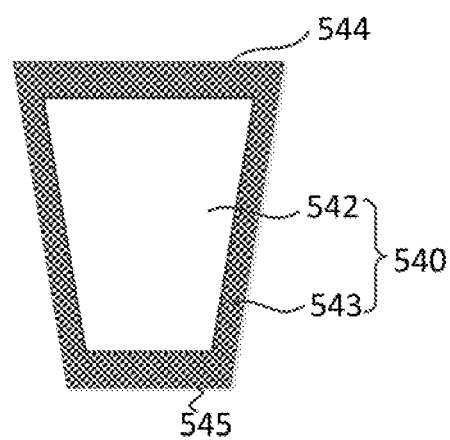
FIG. 5e is a structural schematic view of yet another conductive support column provided by an embodiment of the present application.

FIG. 5e is a structural schematic view of another conductive support column provided by the embodiment of the present application. Further, in combination with FIG. 5e, the conductive support columns 540 include first ends 544 and second ends 545 opposite to the first ends 544, the first ends 544 are electrically connected to a common electrode layer (not shown in the drawing), and the second ends 545 are electrically connected to the common electrode wire 515.

Referring to FIG. 5e, the conductive support columns 540 may include support column main bodies 542 and coating layers 543 coating the support column main bodies 542, and the coating layers 543 are electrically connected to the common electrode layer 522 on the color filter substrate 520 and the common electrode wire 515 on the display panel.

Figure 5F:
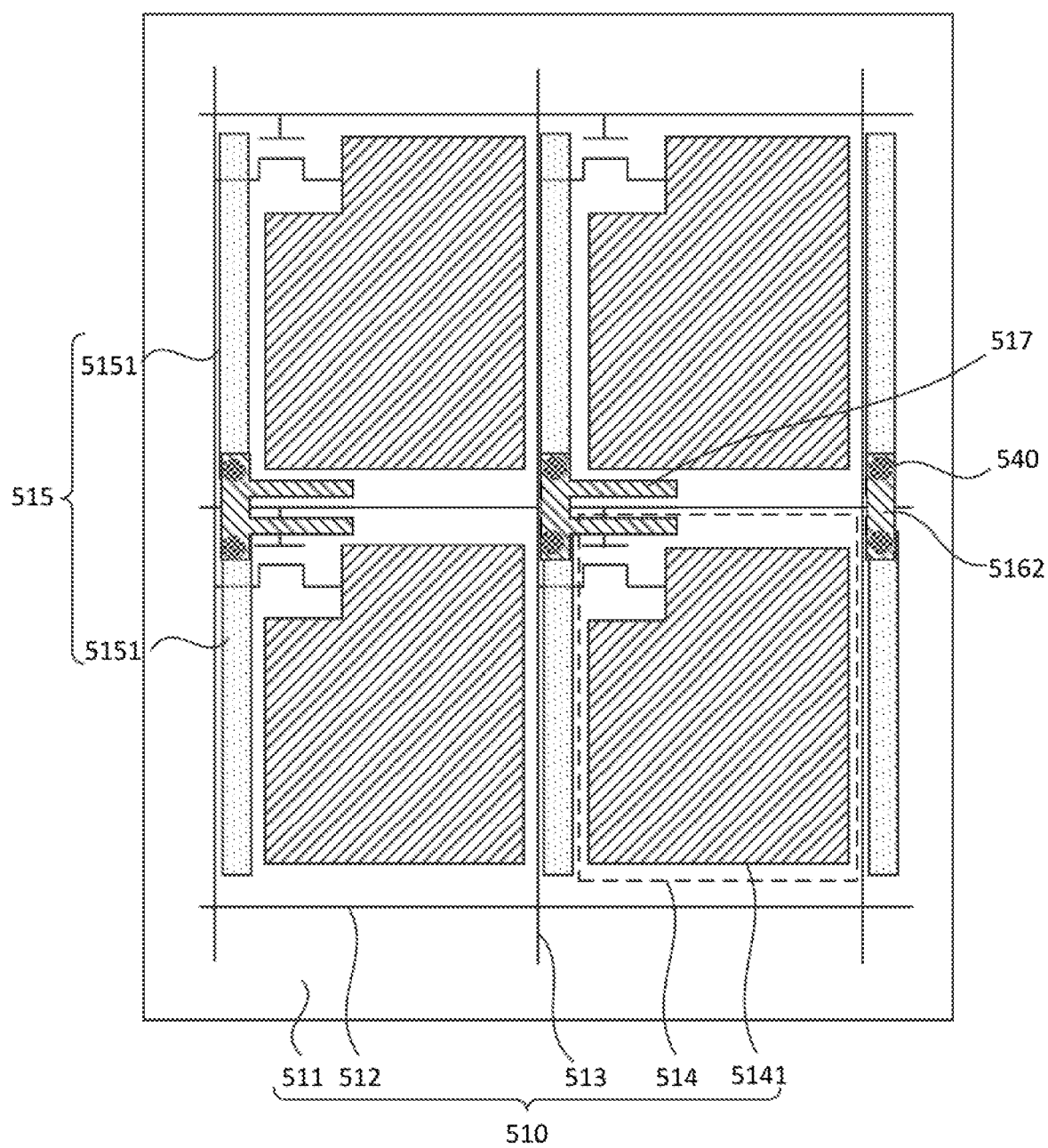
FIG. 5f is a structural schematic view of yet another display panel provided by an embodiment of the present application.

Referring to FIG. 5f, the display panel 510 further includes shield electrodes 517, the shield electrodes 517 are located between the scanning lines 512 and the pixel electrodes 514 adjacent to the scanning lines 512, and are insulated from the scanning lines 512. In this way, by using a shielding action of the shield electrodes 517, the electric field formed between the common electrode and the scanning lines 512 is weakened or eliminated, and further the display effect of the display device is improved.

Further, the shield electrodes 517 are electrically connected to the connecting blocks 5162. In a manufacturing process, the shield electrodes 517 and the connecting blocks 5162 are same in material and are located in the same film layer. In this way, in a manufacturing process, there is no need to respectively manufacture a mask for the shield electrodes 517 and the connecting blocks 5162, and the shield electrodes 517 and the connecting blocks 5162 can be manufactured in the same manufacturing process. The manufacturing process is simplified, production efficiency of the display device is improved, and a production cost of the display device is reduced.

According to the display panel provided by the embodiment of the present application, by disposing the common electrode wire 515 between every two adjacent pixel units 514, the common electrode wire 515 may be used to play a role of shielding, and the electric field E1 formed between a common electrode and the data lines 513 is further weakened or eliminated. By disposing the conductive support columns 540 disposed between the display panel 510 and the color filter substrate 520, the first ends of the conductive support columns 540 are electrically connected to the common electrode layer 522 on the color filter substrate 520, and the second ends of the conductive support columns 540 opposite to the first ends are electrically connected to the common electrode wire 515. The stability of voltages on the common electrode and the common electrode wire 515 can be improved, such that the voltages can be quickly recovered after coupling. The problem of signal crosstalk and uneven display of the display device caused by a coupling phenomenon between the common electrode and the data lines 513 of the existing display device and the problem that the voltages on the common electrode and the common electrode wire 515 are instable and cannot be quickly recovered after coupling are solved. The effects of inhibiting the coupling phenomenon between the common electrode and the data lines 513, improving the stability of the voltages on the common electrode and the common electrode wire 515 and quickly recovering the voltages after coupling are achieved. Further, the display effect of the display device is improved.

Figure 6:
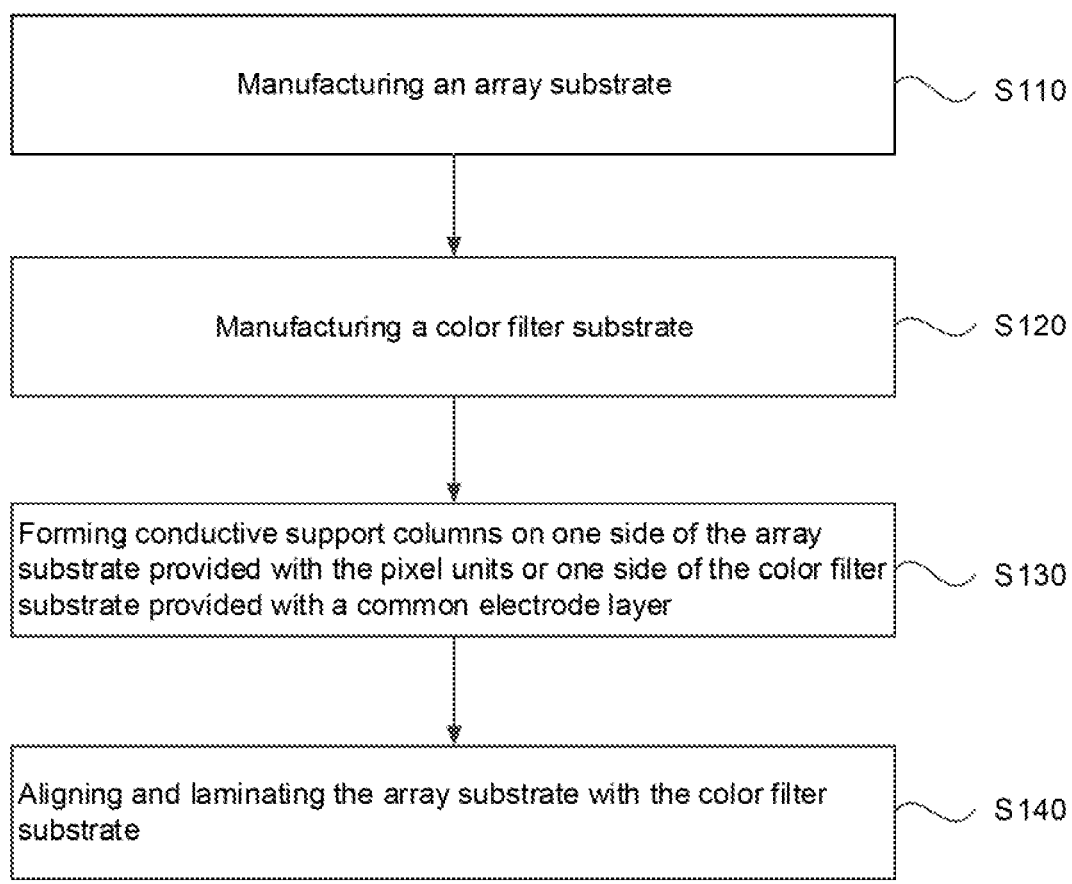
FIG. 6 is a flowchart of a manufacturing method for a display device provided by still a further embodiment of the present application.

FIG. 6 is a flowchart of a manufacturing method for a display device provided by still a further embodiment of the present application. In combination with FIG. 10 and FIGS. 5a-5f, the manufacturing method for a display device includes the following steps.

S10, a display panel, for example, a display panel 510, is manufactured.

The display panel 510 includes a first base substrate 511, scanning lines 512 and data lines 513 formed on the first base substrate 511, and a plurality of pixel units 514 defined by intersection of the scanning lines 512 and the data lines 513. The display panel 510 further includes a common electrode wire 515, and the common electrode wire 515 is disposed between every two adjacent pixel units 514 and is insulated from the data lines 513 and the scanning lines 514. Optionally, the common electrode wire 515 may for example avoid the data lines 513 and be disposed on one side of the data lines 513.

Wherein, the common electrode wire 515 includes connecting leads 5151 and spanning structure 5160 which are formed in sequence. The connecting leads 5151 and the scanning lines 512 are same in material and are located in the same film layer. Therefore, in a manufacturing process, the common electrode wire 5151 and the scanning lines 512 can be manufactured in the same manufacturing process by adopting the same metal mask.

S120, a color filter substrate, for example, a color filter substrate 520 is manufactured.

The color filter substrate 520 includes a second base substrate 521 and a common electrode layer 522 formed on the second base substrate 521.

S130, one side of the display panel 510 provided with the pixel units 514 or one side of the color filter substrate 520 provided with the common electrode layer 522 is provided with the conductive support columns 540.

S140, the display panel 510 and the color filter substrate 520 are aligned and laminated, such that first ends of the conductive support columns 540 are electrically connected to the common electrode layer 522 on the color filter substrate 520, and second ends of the color filter substrate 520 opposite to the first ends are electrically connected to the common electrode wire 515.

It should be noted that the foregoing is merely preferable embodiments and applied technical principles of the present application. Those skilled in the art could understand that the present application is not limited to specific embodiments herein, and can be subjected to various obvious changes, readjustments, and mutual combination and substitution by those skilled in the art without departing from a protective scope of the present application. Therefore, although the present application is explained in detail relatively by the above embodiments, the present application is not limited to the above embodiments, and may further include more other equivalent embodiments without departing from the concept of the present application, and the scope of the present application is decided by the scope of appended claims.

What is claimed is:

1. A manufacturing method for a display device, comprising the following steps
providing a color filter substrate provided with a common electrode layer; and
obtaining a display panel: providing a base substrate, and manufacturing scanning lines, data lines and a plurality of pixel units defined by intersection of the scanning lines and the data lines on the base substrate; manufacturing a plurality of connecting leads and spanning structures enabling the plurality of connecting leads to be electrically connected on the base substrate, to obtain a common electrode wire insulated from the data lines and scanning lines, the connecting leads and the scanning lines being same in material and located in the same film layer;
forming conductive support columns on one side of the display panel provided with the pixel units or one side of the color filter substrate provided with the common electrode layer; and
aligning and laminating the display panel with the color filter substrate, such that first ends of the conductive support columns are electrically connected to the common electrode layer, and the second ends of the conductive support columns opposite to the first ends are electrically connected to the common electrode wire;
wherein the display device comprises:
the color filter substrate, comprising the common electrode layer; and
the display panel, facing the common electrode layer, and disposed opposite to the color filter substrate;
wherein the display panel further comprises:
the base substrate;
the scanning lines, formed on the base substrate extending in a first direction;
the data lines, formed on the base substrate and extending in a second direction intersecting the first direction; and
the plurality of pixel units, located at intersections of the scanning lines and the data lines and forming a pixel unit matrix, the plurality of pixel units comprising pixel electrodes respectively;
the common electrode wire is disposed between each of the data lines and a pixel unit column of the pixel unit matrix adjacent to the data line, extends in the second direction and is insulated from the data lines and the scanning lines; wherein the common electrode wire comprises two connecting leads of the plurality of connecting leads and one of the spanning structures, the two connecting leads located in a same column are electrically connected by the one of the spanning structures, one of the two connecting leads is disposed between two adjacent pixel units of the plurality of pixel units in the first direction, and the other of the two connecting leads is disposed between another two adjacent pixel units of the plurality of pixel units in the first direction;

wherein the spanning structure comprises an insulating layer and a connecting block; the insulating layer is disposed covering the two connecting leads and the corresponding one of the scanning lines, two via holes are defined in and penetrating through the insulating layer and respectively expose local areas of the two connecting leads, the connecting block is disposed overlying the insulating layer and filling into the two via holes to electrically connect the two connecting leads, and the connecting block is further disposed covering the two via holes and crossing over the corresponding one of the scanning lines; and wherein two of the conductive support columns are respectively located directly above the two via holes, each of the two of the conductive support columns comprises the first end and the second end disposed opposite to the first end; the first ends are electrically connected to the common electrode wire by the spanning structure; and the second ends are electrically connected to the common electrode layer.

2. The manufacturing method for the display device according to claim 1, wherein the common electrode wire avoids the data lines and is disposed on one side of the data lines.

3. The manufacturing method for the display device according to claim 1, wherein a shield electrode is disposed between each of the scanning lines and each of the pixel electrodes adjacent to the scanning line, insulated from the scanning line and electrically connected to the connecting block; and the shield electrode and the connecting block are made of the same material and located on a same film layer;

wherein the two connecting leads are separated from one another in the second direction by a corresponding one of the scanning lines disposed between the two connecting leads, and each of the two connecting leads and the corresponding one of the scanning lines are juxtaposed with each other on the base substrate;

wherein each of the two connecting leads is a linear structure having a first end and a second end opposite to the first end, the first end is located just below the connecting block while the second end is far away from the connecting block.

* * * * *